June 29, 1965 S. BERNFELD ET AL 3,192,403
CONTROL LINE DRIVER EMPLOYING OPPOSITE-CONDUCTIVITY-TYPE TRANSISTORS PROVIDING EITHER OF TWO POTENTIALS TO OUTPUT TERMINAL
Filed Nov. 6, 1961
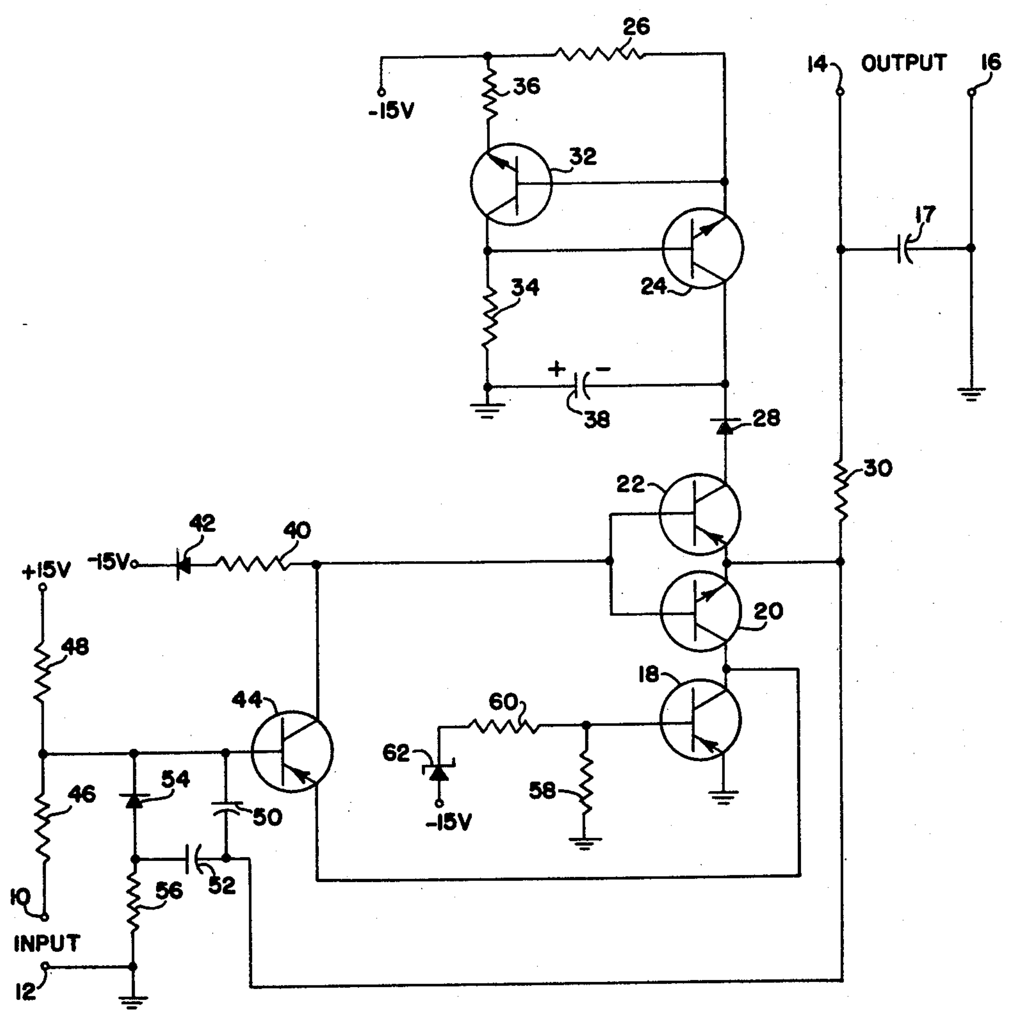
INVENTORS
MAURITZ L. GRANBERG
SYLVAN BERNFELD
BY Meyers & Peterson
ATTORNEYS United States Patent Office 3,192,403

Patented June 29, 1965

3,192,403
CONTROL LINE DRIVER EMPLOYING OPPOSITE-CONDUCTIVITY-TYPE TRANSISTORS PROVIDING EITHER OF TWO POTENTIALS TO OUTPUT TERMINAL

Sylvan Bernfeld, Shoreview, and Mauritz L. Granberg, Richfield, Minn., assignors to Sperry Rand Corporation, New York, N.Y., a corporation of Delaware Filed Nov. 6, 1961, Ser. No. 150,286
12 Claims. (Cl. 307—88.5)

This invention relates generally to pulse amplifiers, and pertains more particularly to control line drivers for transmitting digital information back and forth between a computer and the peripheral equipment associated therewith.

As can well be appreciated, control line drivers must be completely reliable in their functioning. In this regard, close tolerances must be imposed on the rise and fall times of the driver output. Also, spurious signals from transients and feedbacks must be avoided. Still further, provision should be made for limiting current flow under adverse circumstances.

Accordingly, the present invention has for a general object the provision of an efficient control line driver for use in computer installations that will comply with a variety of input-output specifications, including those requirements mentioned immediately above, and which will do so in a simple and straightforward manner.

Briefly, the circuitry that has been selected for illustrating the invention includes a first pair of transistors of opposite conductivity type which serve to connect the driver output to either the negative side or the grounded side of a voltage supply. The biasing of each of these transistors into a conductive or non-conductive state, as the case may be, is controlled by a third transistor turned on by the input signal to the driver. Appropriate capacitors are associated with this third transistor for governing the slope of the output signal. A second pair of interconnected transistors cooperate in limiting the current flow in the circuit should there be a line fault when the output is connected between negative and ground. Still another transistor creates a high impedance path to ground under certain circumstances so that an incorrect output signal will not be generated due to feedback.

These and other objects and advantages of this invention will more fully appear from the following description, made in connection with the accompanying drawing in which:

The single figure constituting the drawing is a schematic representation of one circuit the invention may assume.

Referring now in detail to the drawing, the control line driver there selected to depict our invention includes a pair of input terminals 10, 12 and a pair of output terminals 14, 16, the latter terminals in each instance being connected to ground. The terminals 14, 16 have a capacitor 17 connected thereacross for shunting any unwanted high frequency signals to ground. Although the specific biasing potentials may vary rather widely, we will assume that a potential source is available which provides +15 volts and —15 volts with an intermediate ground at 0 volts. Also, it will be assumed for the sake of discussion that a negative three volt square wave signal having a maximum repetition rate of 20 kc. is applied across the input terminals 10, 12 to produce an output signal at the terminals 14, 16 varying from —15 volts to 0 volts (ground).

For simplicity of discussion a first group of transistors 18, 20, 22 and 24 will now be referred to. As is conventional, these transistors. each have collector, emitter and base elements, the base elements serving as control elements, with the collectors and emitters of these transistors being connected in series with a resistor 26 between the negative side of the voltage supply and its grounded side.

A diode 28 is also included, being connected between the collectors of the transistors 22, 24. It will also be observed that the transistors 18–24 are of alternate conductivity types, the transistors 18, 22 being of P-N-P material and the transistors 20, 24 of N-P-N material. The transistors 20, 22 have their common emitters connected to the output terminal 14 through a load resistor 30. As the description progresses, it will be appreciated that the output terminal 14 can in this way be connected to either —15 volts or to ground.

A fifth transistor 32 has its collector connected to ground through a resistor 34 and its emitter connected to the —15 volt side of the voltage supply via a resistor 36. The base of the transistor 32 here again functions as a control element and is connected between the emitter of the transistor 24 and the resistor 26, whereas the base of the transistor 24 is attached to a point intermediate the collector of the transistor 32 and the resistor 34. The transistors 24 and 32 are thus interconnected so that the transistor 24 will normally be turned on, and the transistor 32 turned off, a capacitor 38 assisting in the realization of this biasing action. On the other hand, if the output terminal 14 shorts to ground, or the resistance between the terminals becomes sufficiently low, the voltage drop across the resistor 26 will increase by reason of the increased current flowing therethrough to cause conduction of the transistor 32 and a concomitant non-conduction of the transistor 24. The reverse biasing of the transistor 24 thus in effect isolates the output terminal from the —15 volt supply side it is connected to when both the transistors 22, 24 are conducting.

The manner in which the transistor 22 is rendered conductive will now be described. In this regard, it will be noted that the base of the transistor 22 is joined to the base of the transistor 20 and that the two bases are in turn connected through a resistor 40 and diode 42 to the minus side of the voltage supply. This applies a negative bias to the base of the transistor 22, and being of P-N-P conductivity the transistor 22 is made conductive. By the same token, the negative bias impressed upon the base of the N-P-N transistor 20 renders it non-conductive. The conductive state of the transistor 22, coupled with the non-conductive state of its complemental transistor 20, applies a negative potential to the output terminal 14 that is derived via the transistor 24.

A sixth transistor 44, this being a P-N-P one, has its collector connected to a point between the resistor 40 and the joined bases of the transistors 20, 22, and has its emitter connected to the juncture of the collectorrs belonging to the transistors 18, 20. The base of the transistor 44, which serves as a control element, is connected through a resistor 46 to the input terminal 10, the resistor 46 being one section of a voltage divider which also includes a resistor 48 attached to +15 volts. In the absence of an input signal at the input terminals 10 and 12, the base of the transistor 44 will be made sufficiently positive to drive this transistor to cut-off. Between the base of transistor 44, however, and the resistor 30 in the circuit leading to the output terminal 14 is a capacitor 50. Paralleling this capacitor 50 is a second capacitor 52 and diode 54. The juncture of the capacitor 52 and diode 54 is connected to ground through a resistor 56. The capacitors 50, 52 determine the turn-on and turn-off times of the transistor 44. For instance, when the input signal across the terminals 10, 12 is going negative, the transistor 44 will not become conductive until both of the capacitors 50, 52 have become sufficiently charged. This in turn governs the slope or rise-time of the output signal when changing from —15 volts to zero. On the other hand, when the input signal is going positive, owing to the manner in which the diode 54 is poled, only the capacitor 50 is effective in determining the cut-off time of the transistor 44 and hence the fall-time of the output signal when going from zero to −15 volts.

Attention is now directed to the transistor 18. The base of this transistor is connected to ground through a resistor 58 and to −15 volts through a resistor 60 and a Zener diode 62. Without power applied to the circuit from the voltage supply, it can be readily appreciated that the transistor 18 is non-conductive and that a high impedance path from its collector to ground is presented. Since both the collector of the transistor 20 and the emitter of the transistor 44 are attached to the collector of the transistor 18, it follows that neither of these transistors 20, 44 can be made conductive when the transistor 18 is non-conductive. In this regard, although not completely obvious, in certain computer installations, say, especially when the driver is located at the peripheral equipment, it is possible that a negative potential of sufficient magnitude exists at the terminal 14, which in this case is tied to the computer, which will feed back through the emitter of the transistor 20 and hence to the base of this particular transistor so as to in effect pull the terminal 14 toward ground potential. A zero or ground potential at the terminal constitutes a binary "1," which would of course be incorrect. With the transistor 18 connected as shown a high impedance to ground is presented, and the foregoing situation cannot arise. The diodes 28 and 42, it will be understood, eliminate any electrical paths to ground through the power supplies.

However, with power supplied to the circuit, the transistor 18 becomes saturated owing to the negative bias applied to the base thereof through the Zener diode 62, and the collector of the transistor 20 and the emitter of the transistor 44 are in effect tied to ground while power is applied. It might be pointed out at this time, though, that the Zener diode 62 will not apply a negative bias to the base of the transistor 18 until the voltage has reached approximately a −12 volt value. This has the advantage of preventing any false output signals from appearing at the terminal 14 due to transients during the interval of voltage application or build-up.

For the most part, the manner in which our driver system operates has been presented in conjunction with the foregoing description. Very briefly, though, when a negative pulse is applied to the input terminals 10 and 12, the transistor 44 is caused to conduct, the turn-on time being influenced by the capacitors 50 and 52. The conduction of the transistor 44 causes current to flow through the resistor 40 and the accompanying potential drop across this resistor changes the bias impressed on the base of the transistor 20 in a positive direction to cause condutcion of the transistor 20. Owing to the low impedance of the forwardly biased transistor 18, the output terminal 14 is connected to ground or 0 volts, the time taken for the terminal 14 to be switched from the heretofore −15 volts to said 0 volts being determined by the capacitors 50 and 52 as already indicated.

When the negative input pulse starts returning to zero, that is going positive, the transistor 44 will continue to conduct as long as the capacitor 50 remains sufficiently charged to maintain enough negative bias on the base of the transistor 44. As the transistor 44 starts to turn off, the base of the transistor 20 goes more and more negative, and the same holds true for the base of the transistor 22. However, being of opposite conductivity type, the transistor 22 starts turning on during this transitional interval. Since the discharge rate of the capacitor 50 influences the turning off of the transistor 44, it in turn determines the fall-time in which the terminal 14 changes from 0 potential to −15 volts, this latter potential being reached due to the conductive path established through the collector-emitter connections of the transistors 22 and 24.

It will be appreciated that the transistor 24 is normally conducting. However, should a short occur across the output terminals 14 and 16, or should for some reason the connected resistancce across these terminals fall too low, say, 820 ohms or less, then the potential drop across the resistor 26 will cause the bias applied to the base of the transistor 32 to increase in a positive direction to cause conduction of the transistor 32, thereby completing a circuit through the resistors 34, 36 between −15 volts and ground. This produces a more negative bias at the base of the transistor 24 with the consequence that this transistor is turned off, thereby disconnecting the terminal 14 from the −15 volt side of the supply potential.

The role played by the transistor 18 has already been dealt with at some length. Primarily, its job is to preclude feedback via the terminal 14 when the voltage supply of the driver is turned off or disconnected, for a high impedance path then exists between the collector of this transistor 18 and its grounded emitter. Also, as earlier explained, through the agency of the Zener diode 62 spurious output signals at the terminal 14 are avoided.

Thus, it will be noted that the driver arrangement of the present invention controls the slope of the output signal, provides current limiting protection, and additionally precludes undesirable feedback from taking place.

It will, of course, be understood that various changes may be made in the form, details, arrangements and proportions of the parts without departing from the scope of this invention as set forth in the appended claims.

What is claimed is:

1. A control line driver comprising a voltage supply having first and second sides for providing a desired potential therebetween, a first resistor, first, second, third and fourth transistors having collector, emitter and base elements, one element of each transistor constituting a control element, said first and third transistors being of opposite conductivity type from said second and fourth transistors, means connecting the remaining pair of elements of each transistor in a serial relation with said resistor and said resistor to said first side of said voltage supply, one of the said remaining elements of said first transistor being connected to the second side of said voltage supply, a fifth transistor having collector, emitter and base elements, one of said elements of said fifth transistor constituting a control element, means connecting the remaining pair of the elements of said fifth transistor across said voltage supply, means connecting the control element of said fifth transistor to the end of said resistor adjacent said fourth transistor, means connecting the control element of said fourth transistor to the one of the pair of elements of said fifth transistor lying more remote from said resistor, whereby current of increased magnitude through said resistor will bias said fifth transistor into a conductive state and the conduction of said fifth transistor will in turn bias said fourth transistor into a non-conductive state, a second resistor having one end connected to said first side of the said voltage supply, means connecting the other end of said second resistor to the control elements of both said second and third transistors to bias said third transistor into a conductive state and said second transistor into a nonconductive state, means connecting the control element of said first transistor to said first side of said voltage supply to forward bias said first transistor, a sixth transistor having collector, emitter and base elements, one of said last-mentioned elements constituting a control element, means connecting the remaining pair of the elements of said sixth transistor between said other end of said second resistor and the juncture of said pairs of elements of said first and second transistors, means connecting the control element of said sixth transistor to an input terminal, means connecting the juncture of said pairs of elements of said second and third transistors to an output terminal, the biasing of said first transistor into a conductive state establishing a low impedance path to said second side of said voltage supply via said pair of elements of said first transistor.

2. A control line driver in accordance with claim 1 including capacitance means connected in circuit with the control element of said sixth transistor for controlling the conduction of said sixth transistor when a signal is applied to said input, whereby the rise and fall of the signal produced at said output will in turn be governed.

3. A control line driver in accordance with claim 2 in which said capacitance means includes a first capacitor connected between said control element of said sixth transistor and said output terminal, and a second capacitor connected between said second side of said voltage supply and said output terminal, said driver further including a diode connected across both of said capacitors.

4. A control line driver in accordance with claim 1 in which said means connecting the control element of said first transistor to said voltage supply includes a Zener diode.

5. A control line driver comprising a voltage supply having first and second sides for providing a desired potential therebetween, input and output terminals, first, second, third and fourth transistors each having a collector, emitter and base, said first and third transistors being of P-N-P conductivity type and said second and fourth transistors being of N-P-N conductivity type, said first and second transistors having their collectors joined together and the emitters of said second and third transistors being joined together and connected to said output terminal, the emitter of said first transistor being connected to the second side of said voltage supply, a resistor having one end connected to said first side of said voltage supply and its other end connected to the emitter of said fourth transistor, the collector of said fourth transistor being connected to the collector of said third transistor, a fifth transistor having a collector, emitter and base with its collector connected to the base of said fourth transistor and to the second side of said voltage supply, said fifth transistor having its emitter connected to said one end of said resistor and having its base connected to said other end of the resistor, whereby a sufficient potential drop across said resistor due to a predetermined flow of current therethrough will apply a biasing potential to the base of said fifth transistor to cause conduction thereof with a concomitant change in the biasing potential applied to the base of said fourth transistor to cause nonconduction thereof, means connecting the bases of said second and third transistors to said first side of said voltage supply including a resistor, a sixth transistor having a collector emitter and base with its collector connected to a point between last mentioned resistor and the bases of said second and third transistors, its emitter connected to the collectors of said first and second transistors, and its base connected to said input terminal, a first capacitor connected between the base of said sixth transistor and said output terminal, a second capacitor and diode connected in series across said first capacitor whereby both of said capacitors determine the rise-time of the output signal at said output terminal and said first capacitor determines the fall-time of said output signal, and means connected to said voltage supply for applying a biasing potential to the base of said first transistor to cause conduction thereof and thereby provide a low impedance path between the collector of said second transistor and said second side of said voltage supply.

6. A control line driver comprising an input terminal and an output terminal, first and second transistors of opposite conductivity types having collector, emitter and base elements, means connecting said output terminal to a first corresponding element of each of said transistors, means connecting a second element of said first transistor to one potential, means connecting a corresponding second element of the second transistor to a different potential, the remaining element of each transistor being a control element, means connected to said control elements for forward biasing said first transistor into a conductive state to apply said one potential to said output terminal via said first and second elements of said first transistor and reverse biasing said second transistor into a non-conductive state, a third transistor having collector, emitter and base elements, one of said last elements being a control element and connected to said input terminal for biasing said third transistor into a conductive state upon receipt of an input signal at said input terminal, another of the elements of said third transistor being connected to the said control elements of said first and second transistors and the remaining element of said third transistor being connected to the second element of said second transistor, means responsive to conduction of said third transistor for causing said first-mentioned biasing means to bias said first transistor into a non-conductive state and said second transistor into a conductive state to apply said different potential to said output terminal via said first and second elements of said second transistor, a fourth transistor having collector, emitter and base elements, two of said last-mentioned elements being in series with the first and second elements of said first transistor and said one potential and the remaining element being a control element, and means responsive to current passing through said two last-mentioned elements having connection with the control element of said fourth transistor for reverse biasing said fourth transistor when a predetermined current flow occurs to thereby prevent application of said one potential to said output terminal.

7. A control line driver in accordance with claim 6 in which said last-mentioned biasing means includes a resistor in series with said last-mentioned two elements and a fifth transistor having collector, emitter and base elements, one of the elements of said fifth transistor being a control element connected to a point between said resistor and the nearer one of the series-connected elements of said fourth transistor and one of the other elements of said fifth transistor being connected to the control element of said fourth transistor and the remaining element of said fifth transistor being connected to a point between said resistor and said one potential, and means responsive to said predetermined current flowing through said resistor to cause said reverse biasing of said fourth transistor via its control element and conduction of said fifth transistor.

8. A control line driver comprising an input terminal and an output terminal, first and second transistors of opposite conductivity types having collector, emitter and base elements, means connecting said output terminal to a first corresponding element of each of said transistors, means connecting a second element of first transistor to one potential, means connecting a corresponding second element of the second transistor to a different potential, the remaining element of each transistor being a control element, means connected to said control elements for forward biasing said one transistor into a conductive state to apply said one potential to said output terminal via said first and second elements of said first transistor and reverse biasing said second transistor into a non-conductive state, a third transistor having collector, emitter and base elements, one of said last elements being a control element and connected to said input terminal for biasing said third transistor into a conductive state upon receipt of an input signal at said input terminal, another of the elements of said third transistor being connected to said control elements of said first and second transistors and the remaining elements of said third transistor being connected to the second element of said second transistor, means responsive to conduction of said third transistor for causing said first-mentioned biasing means to bias said one transistor into a non-conductive state and said second transistor into a conductive state to apply said different potential to said output terminal via said first and second elements of said second transistor, a fourth transistor having collector, emitter and base elements, two of the elements of said fourth transistor being in series with the first and second elements of said second transistor and with said different potential and the remaining element of said fourth transistor being a control element, means connected to the control element of said fourth transistor for biasing said fourth transistor into a conductive state only when power is applied to the circuitry constituting the driver to provide a low impedance from said second transistor to said different potential.

9. A control line driver comprising an input terminal and an output terminal, power supply means for furnishing first and second voltages of different values, first, second, third and fourth transistors, means connecting said first and second transistors in series to provide a low resistance path between said first voltage and said output terminal when said first and second transistors are in a conductive state, means connecting said third transistor to provide a low resistance path between said second voltage and said output terminal when said third transistor is in a conductive state, means normally biasing said second transistor into a non-conductive state, means biasing said first transistor into a conductive state, said first transistor providing a high resistance path when in a non-conductive state, means connecting said fourth transistor to said input terminal for biasing said fourth transistor into a conductive state when a predetermined pulse signal is applied to said input terminal, and means associated with said fourth transistor for causing conduction of said second transistor and non-conduction of said third transistor when said fourth transistor is conductive to provide said low resistive path between aid first voltage and said output terminal.

10. A control line driver comprising an input terminal and an output terminal, power supply means for providing a first voltage point and a second voltage point of different magnitude from said first voltage point; first, second, third and fourth transistors, each having first, second, and third electrodes, said first electrode in each instance being a control electrode, means connecting the second and third electrodes of said first and second transistors, with said second electrodes forming a juncture, in a serial relation between said first voltage point and said output terminal; means connecting the second and third electrodes of said third transistor in a serial relation between said output terminal and said second voltage point; means in circuit with said second voltage point and the control electrode of said first transistor for forward biasing said first transistor; means connected to the control electrodes of said second and third transistors for normally forward biasing said third transistor and reverse biasing said second transistor; means in circuit with said input terminal and the control electrode of said fourth transistor for forwardly biasing said fourth transistor when a predetermined pulse signal is applied to said input terminal said second electrode of said fourth transistor being connected to the first electrodes of said second and third transistors and the third electrode of said fourth transistor to the juncture of the second electrodes of said first and second transistors, and means connecting said last-mentioned means with the means immediately preceding said last-mentioned means for modifying the biasing action thereof to cause forward biasing of said second transistor and reverse biasing of said third transistor when said fourth transistor is forward biased, said modifying means including therein said second and third electrodes of said fourth transistor.

11. A control line driver comprising an input terminal and an output terminal, means providing first and second different potentials, first and second transistors of opposite conductivity types, means connecting said output terminal to said first potential via said first transistor so as to apply said first potential to said output terminal when said first transistor is conductive, a third transistor of the same conductivity type as said first transistor, said third transistor having a relatively high impedance when in a non-conductive state, means connecting said output terminal to said second potential via said second and third transistors when said second and third transistors are in their conductive states, first means biasing said third transistor into its conductive state, second means connected to said input terminal and to said first and second transistors for biasing said first transistor into its conductive state and said second transistor into its non-conductive state when no signal is applied to said input terminal and to cause said first transistor to be biased into its non-conductive state and said second transistor to be biased into its conductive state when a signal is applied to said input terminal, whereby said second potential can be applied to said output terminal only when both said second and third transistors are in their conductive states due to the high impedance provided by said third transistor when in its non-conductive state.

12. A control line driver in accordance with claim 11 in which said second biasing means includes a fourth transistor, and capacitance means associated with said fourth transistor for determining the turn-on and turn-off times of said fourth transistor to thereby govern the rise and fall times of the output signal applied to said output terminal from said second potential.

References Cited by the Examiner

UNITED STATES PATENTS

| | | | |
|---|---|---|---|
| 2,880,332 | 3/59 | Wanlass | 307—88.5 |
| 2,987,632 | 6/61 | Milford | 307—88.5 |
| 3,040,238 | 6/62 | Taddeo | 307—88.5 |

ARTHUR GAUSS, *Primary Examiner.*

JOHN W. HUCKERT, *Examiner.*